Patented Jan. 30, 1951

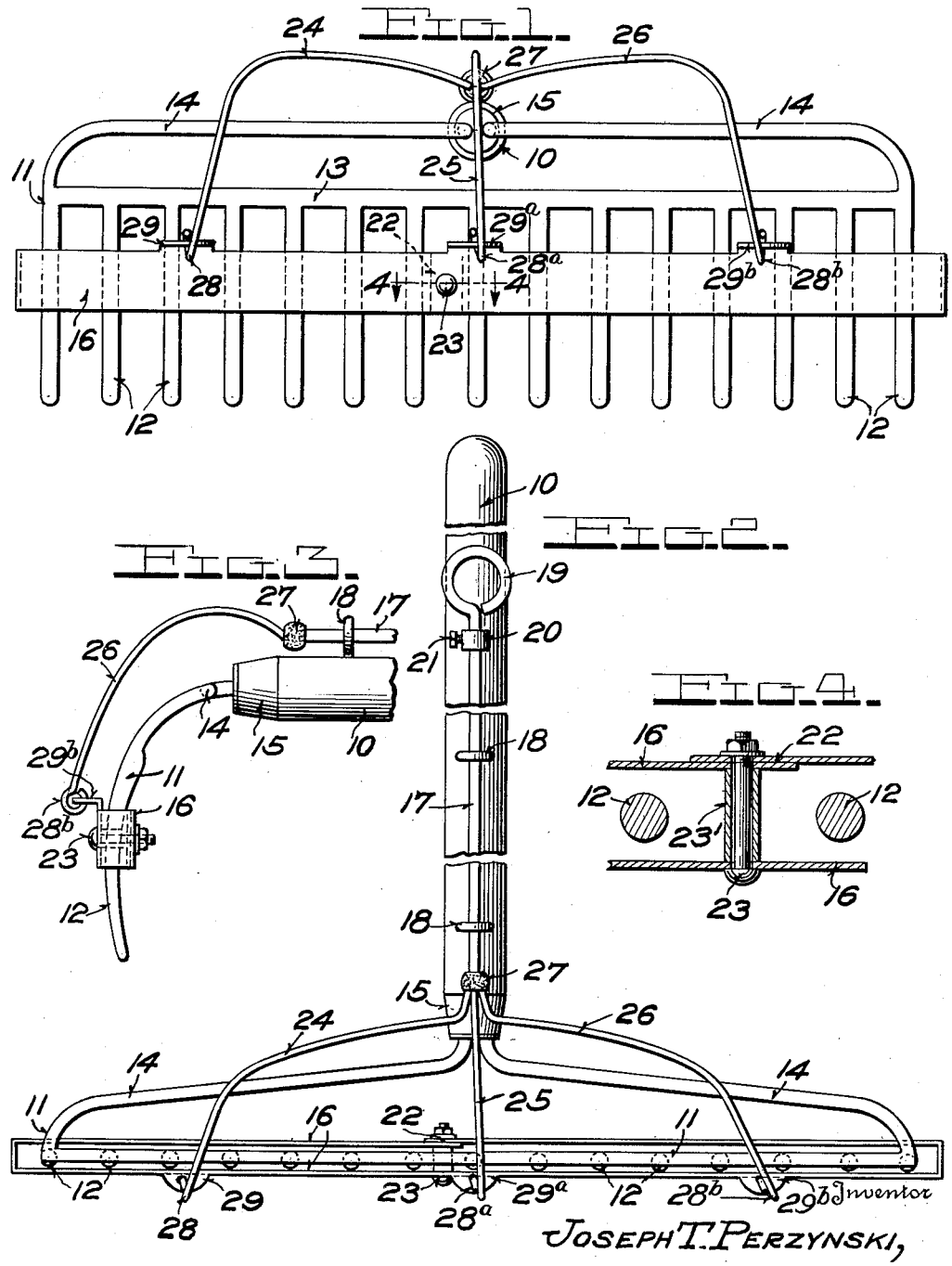

2,539,590

UNITED STATES PATENT OFFICE 2,539,590

CLEANING ATTACHMENT FOR GARDEN RAKES

Joseph T. Perzynski, Stevens Point, Wis.

Application October 17, 1949, Serial No. 121,718

2 Claims. (Cl. 56—400.1)

My invention relates to garden rakes and more particularly to cleaning attachments to be applied to such rakes for readily removing leaves, grass and other trash which clings to the teeth.

The principal object of the invention is to provide an extremely simple and inexpensive rake cleaning attachment which may be easily applied to various forms of garden rakes without changing their constructions, and which will be strong, durable and effective in operation.

Another object of the invention is to provide the rake teeth with a surrounding leaf-clearing or ejector band which is mounted for floating movement on the row of teeth so that it may not only have reciprocatory movement lengthwise of the teeth but also angular or tilting movements lengthwise and crosswise of the row of teeth, the ejector band being suspended and actuated by resilient means connected between it and a push-pull rod on the rake handle, the connecting means being such that it alone transfers the movement of the rod to the ejector band.

With the above and other objects and advantages in view the invention resides in the novel features of construction and the novel combinations and arrangements of parts hereinafter described and claimed, and illustrated in the accompanying drawings in which:

Fig. 1 is a front end elevation of a well known form of garden rake having the cleaning device applied thereto, the trash ejector bar being shown in an intermediate position on the rake teeth, Fig. 2 is a top plan view with parts broken away, Fig. 3 is a detail side view of the parts shown in Fig. 1, and Fig. 4 is a detail section on line 4—4 of Fig. 1 on an enlarged scale.

Referring more in detail to the drawings the numeral 10 denotes a handle carrying a rake head 11 with its row of parallel teeth or tines 12 disposed in a transverse plane substantially perpendicular to the longitudinal axis of the handle. While the teeth may be straight, they are shown in Fig. 3 with a slight curvature and are integral with a head bar 13 to the ends of which are welded attaching arms 14. The latter are shaped as shown with inner ends fastened in the end of the handle within the usual ferrule 15.

The attachment comprises an ejector or cleaning member 16 which is moved up and down on the teeth 12 by reciprocating a pull-push rod 17 mounted on the handle. The operating rod is a stiff three-sixteenths inch metal rod slidable in screw eyes 18 on the top side of the wooden handle and has at its upper or rear end a finger ring or hand piece 19. Slidably adjustable on the rod is a stop collar 20 adapted to strike an adjacent screw eye or guide 18 to limit the downward movement of the rod for a purpose hereinafter explained. A set screw 21 in the stop secures it in an adjusted position.

The leaf or trash ejector 16 is in the form of a elongated rectangular band made of heavy gage sheet metal and of a size to loosely surround all of the teeth 12 so as to be easily moved therealong from the upper to the lower ends of the teeth. As shown the band has straight parallel front and rear walls spaced from each other a distance substantially greater than the front-to-rear thickness of the teeth, and short end walls spaced from each other a distance substantially greater than the distance between the outer edges of the endmost rake teeth. Hence the opening in the ejector band is substantially longer than the length of the rake head and also substantially wider than the thickness of the rake teeth so that the band substantially floats on the head and may have some tilting movement both lengthwise and crosswise of the head, such movements being necessary by reason of the connection later described between the ejector and its operating rod. The ejector may be inexpensively made by bending a long and wide strip of sheet metal and bringing its ends into overlapping relation, as shown at 22, adjacent to the center of the rake head on the rear side thereof. The overlapped ends 22 may be secured together by welding or riveting. I show a bolt and nut 23 in a spacing sleeve 23' positioned between the front and rear portions of the band or loop 16. These parts extend between two of the rake teeth and hence do not interfere with the free or floating movement of the ejector band on the teeth. The sleeve or the bolt, when the sleeve is omitted, serves to limit the upward movement of the ejector on the rake head by contacting the head bar 13 and also to holding the front and rear portions of the band in proper position without interferring with said sliding and limited tilting or swinging movements of the band. A pin such as a rivet may of course be used in place of the bolt and sleeve.

For the purpose of yieldably supporting the ejector band and imparting to it the movement of the push-pull rod 17, I provide three longitudinally curved and relatively stiff but resiliently yieldable wire rods 24, 25 and 26 preferably made from 20 gauge steel wire. These three connecting wires have their upper converging ends brought together and welded at 27 to the lower end of the rod 17. The central wire 25 is pivotally or loosely connected to the center of the ejector while the lower diverging ends of the other two wires are similarly connected to the ejector at points adjacent the ends of the latter and which are equally distant from the center of the ejector. These loose or pivotal connections are made by bending the respective lower ends of the three wires 24, 25, 26 to form eyes 28, 28a and 28b which respectively engage apertures in properly positioned ears 29, 29a and 29b formed integral with the upper edge of the front side of the ejector band, said ears being bent outwardly or forwardly at right angles to the ejector. By making the ejector loop or band 16 so that it floats freely on the teeth 12 and by using the three relatively stiff but resiliently yieldable wires 24, 25, and 26 with one end of each welded or rigidly attached to the push-pull rod and their other ends loosely connected at the three longitudinally spaced points on the ejector, I am able to do away with guides or other complicated and expensive parts, and actuate the ejector by extremely simple and inexpensive means. While the ejector will effectively remove any leaves, grass or other trash on the rake teeth when it is moved down on them to their lower ends, the resiliency of the connecting wires in connection with the floating movement of the ejector on the rake head will permit the parts to yield if the teeth impale an apple, potato or the like, and there is no likelihood of the parts breaking or being bent or otherwise damaged. The construction is also such that the attachment may be easily applied to any of various forms of rakes of the proper size.

In the drawings for the sake of clearness, the ejector 16 is shown in an intermediate position but it will normally be at the top of the head when the rake is in use. When the operating rod 17 is pushed downwardly to clean the rake teeth, the stop 20 will strike the adjacent guide 18 when the bottom edge of the ejector band reaches the lower ends of the teeth. Hence the ejector cannot be forced off the teeth and because of its width the rake may be used as a pushing or dragging device when the ejector is in such lowered position.

Upon reference to Fig. 3, which as above stated shows the ejector band in an intermediate position, it will be noted that the reciprocatory movement of the band on the teeth is in a plane substantially at right angles to the movement of the push-pull rod on the handle. It is therefore obvious that when the rod is reciprocated to raise and lower the band 16, the wires 24, 25, 26 must flex or bow longitudinally notwithstanding the loose pivotal connections between the lower ends of the wires and the ears on the band. While the wires are sufficiently stiff to transmit downward movement of the rod 17 to the band 16 so that leaves and grass accumulated on the rake teeth will be pushed off on them, the wires must be sufficiently flexible to permit them to bow during the above mentioned operation and also to permit them to yield upwardly when the band is angled or tilted by a solid object such as an apple or potato being impaled on the teeth near either end of the rake head. When such object is removed from the rake teeth, the wires spring back to their normal shape and return the band to a horizontal position. Hence there is no danger of breakage.

I claim:

1. A cleaning attachment for a rake having a handle carrying a transverse head with a row of teeth projecting from a bar and disposed substantially perpendicular with the axis of the handle, comprising a push-pull rod for slidable mounting on the rake handle, a teeth-clearing ejector band of open rectangular shape loosely surrounding all of the rake teeth, said band having end walls spaced from each other a distance substantially greater than the distance between the outer edges of the endmost teeth and also having front and rear walls spaced from each other a distance substantially greater than the front-to-rear thickness of the teeth, whereby the band may have free reciprocating movement lengthwise of the teeth, and also appreciable tilting movement both lengthwise and crosswise of the row of teeth; and means for floatably supporting said ejector band on the teeth and actuating it in its reciprocatory movement while permitting it to have tilting movement when a solid object is impaled on the teeth, said means comprising three longitudinally curved, relatively stiff, resiliently yieldable wires having their upper ends rigidly secured to the lower end of said push-pull rod, loose pivotal connections between the lower ends of said wires and longitudinally spaced points on said ejector band, one of said wires being connected to the center of said ejector band and the other two connected at points adjacent the ends of said ejector band and at equal distances from the center of the latter, the parts being so constructed and arranged that the movement of said push-pull rod will be imparted to said ejector band solely by said wires, the latter while bowing longitudinally in the transmission of such movement, being sufficiently stiff to cause the normal reciprocatory movement of said ejector band, and at the same time the yieldability of said wires permitting said ejector band to tilt on the rake teeth when a solid object is impaled on the teeth.

2. A cleaning attachment for a rake having a handle carrying a transverse head with a row of teeth projecting from a bar and disposed substantially perpendicular with the axis of the handle, comprising a push-pull rod for slidable mounting on the rake handle; a teeth-clearing ejector band of rectangular shape to surround and loosely enclose all of the rake teeth, said band being formed from a single narrow strip of sheet metal bent to provide two end walls extending rearwardly from the ends of a straight front wall and a straight rear wall parallel with the front wall and formed by end portions of the strip extending inwardly from the end walls with their extremities overlapped at the central portion of the band, a bolt disposed between two adjacent rake teeth and connecting the overlapped portions of the rear wall with the front wall, apertured ears formed integral with the upper edge of said front wall and bent forwardly therefrom, one of said ears being positioned at the center of said band and the others adjacent the ends of said band and at equal distances from the central ear, said end walls being spaced a distance substantially greater than the distance between the outer edges of the endmost rake teeth, and said front and rear walls being spaced a distance substantially greater than the front-to-rear thickness of the rake teeth, whereby said band may have appreciable tilting movements lengthwise and crosswise of the row of teeth and free reciprocatory movement lengthwise of the teeth; and means for floatably supporting said ejector band on the teeth and actuating it in its reciprocatory movement while permitting it to have tilting movement when a solid object is impaled on the teeth, said means comprising three longitudinally curved, relatively stiff, resiliently yieldable wires having their upper ends rigidly secured to the lower end of said push-pull rod, the lower ends of said wires being formed with closed eyes respectively engaged with said apertured ears to loosely pivot said wires to said band, the parts being so constructed and arranged that the movement of said push-pull rod will be imparted to said ejector band solely by said wires, the latter while bowing longitudinally in the transmission of such movement, being sufficiently stiff to cause the normal reciprocatory movement of said ejector band, and at the same time the yieldability of said wires permitting said ejector band to tilt on the rake teeth when a solid object is impaled on the teeth.

JOSEPH T. PERZYNSKI.

REFERENCES CITED

The following references are of record in the file of this patent:

UNITED STATES PATENTS

| Number | Name | Date |
| --- | --- | --- |
| 1,116,121 | Reidt | Nov. 3, 1914 |
| 1,255,337 | Quade et al. | Feb. 5, 1918 |
| 2,016,263 | Beythan | Oct. 1, 1935 |